(12) United States Patent
Chen

(10) Patent No.: US 9,983,639 B2
(45) Date of Patent: May 29, 2018

(54) DATA STORAGE MOUNTING APPARATUS

(71) Applicant: CLOUD NETWORK TECHNOLOGY SINGAPORE PTE. LTD., Singapore (SG)

(72) Inventor: Hung-Wei Chen, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 0 days. days.

(21) Appl. No.: 15/181,629

(22) Filed: Jun. 14, 2016

(65) Prior Publication Data

US 2017/0344080 A1 Nov. 30, 2017

(30) Foreign Application Priority Data

May 26, 2016 (CN) .......................... 2016 1 0358460

(51) Int. Cl.
*G06F 1/18* (2006.01)

(52) U.S. Cl.
CPC .................................. *G06F 1/187* (2013.01)

(58) Field of Classification Search
CPC ...................................................... G06F 1/187
USPC ............................ 211/40; 361/679.33–679.39
See application file for complete search history.

(56) References Cited

U.S. PATENT DOCUMENTS

| | | | | | |
|---|---|---|---|---|---|
| 5,191,983 | A | * | 3/1993 | Hardy | A47B 81/067 206/308.1 |
| 5,685,439 | A | * | 11/1997 | Luenser | A47B 87/0207 211/183 |
| 5,746,325 | A | * | 5/1998 | Lee | G11B 23/0236 211/194 |
| 6,301,105 | B2 | * | 10/2001 | Glorioso | G11B 33/022 248/634 |
| 6,580,606 | B1 | * | 6/2003 | Leman | G06F 1/184 312/223.1 |
| 7,017,875 | B2 | * | 3/2006 | Chen | G11B 33/124 248/300 |
| 7,031,150 | B2 | * | 4/2006 | Chen | G06F 1/184 248/611 |
| 7,031,152 | B1 | * | 4/2006 | Tsai | G06F 1/184 312/223.2 |
| 7,660,112 | B2 | * | 2/2010 | Carr | G06F 1/187 312/223.1 |
| 8,011,503 | B2 | * | 9/2011 | Hartman | G11B 33/0444 206/232 |
| 8,213,172 | B2 | * | 7/2012 | Sun | G06F 1/16 361/679.33 |
| 8,215,727 | B2 | * | 7/2012 | Barrall | G06F 1/187 312/223.2 |
| 9,383,784 | B2 | * | 7/2016 | Lo | G06F 1/187 |
| 2013/0163172 | A1 | * | 6/2013 | Chen | G06F 1/187 361/679.31 |
| 2014/0118921 | A1 | * | 5/2014 | Lin | G06F 1/187 361/679.33 |
| 2014/0175232 | A1 | * | 6/2014 | Hu | G06F 1/187 248/68.1 |

* cited by examiner

*Primary Examiner* — Stanton L Krycinski
(74) *Attorney, Agent, or Firm* — ScienBiziP, P.C.

(57) ABSTRACT

A mounting apparatus for data storage devices includes a plurality of installing racks and a plurality of data storage devices. The installing racks are stackable together and can be fixed together. Each installing rack defines a receiving space into which one data storage device can be received.

14 Claims, 5 Drawing Sheets

DATA STORAGE MOUNTING APPARATUS

CROSS-REFERENCE TO RELATED APPLICATIONS

This application claims priority to Chinese Patent Application No. 201610358460.0, filed on May 26, 2016, the contents of which are incorporated by reference herein.

FIELD

The subject matter herein generally relates to mounting apparatuses for data storage devices.

BACKGROUND

Servers include at least one installation rack to receive at least one data storage device. Installation racks may have different sizes. One installation rack may receive only one device, another installation rack may receive four devices. When a user only has four-device installation racks, but the server needs only one device, a space for three devices is wasted.

BRIEF DESCRIPTION OF THE DRAWINGS

Implementations of the present technology will now be described, by way of example only, with reference to the attached figures.

DETAILED DESCRIPTION

Figure 1:
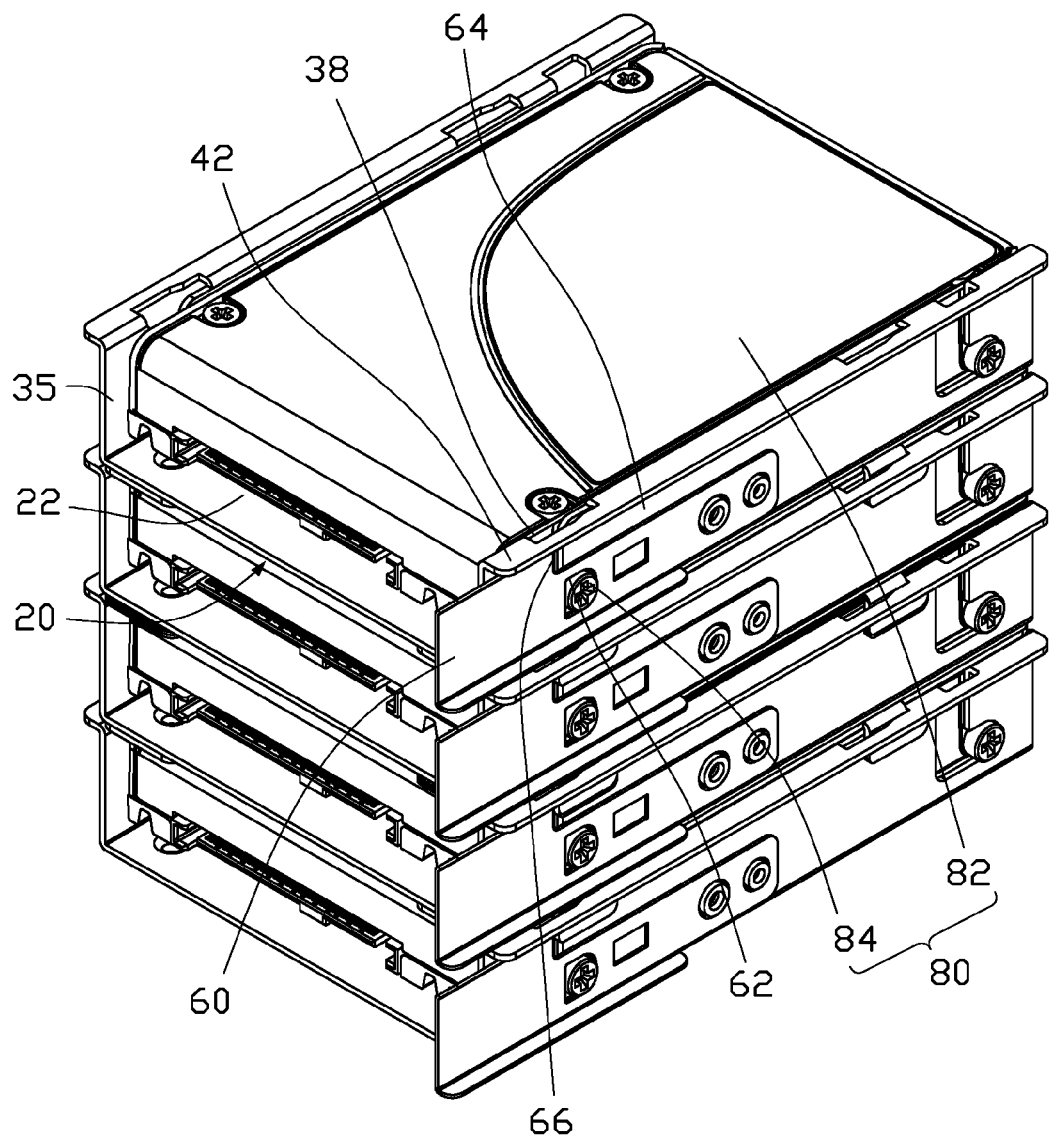
FIG. 1 is an isometric view of a data storage mounting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

FIG. 1 illustrates a data storage mounting apparatus 100. The data storage mounting apparatus 100 includes a number of installing racks 20 and a number of data storage devices 80. The data storage device 80 can be a hard disk drive or solid state drive. The data storage devices 80 are fixed one-by-one to the installing racks 20. The installing racks 20 are stackably arranged and can be fixed together. A receiving space 22 is defined in each installing rack 20. The data storage device 80 is received in the receiving space 22.

Figure 2:
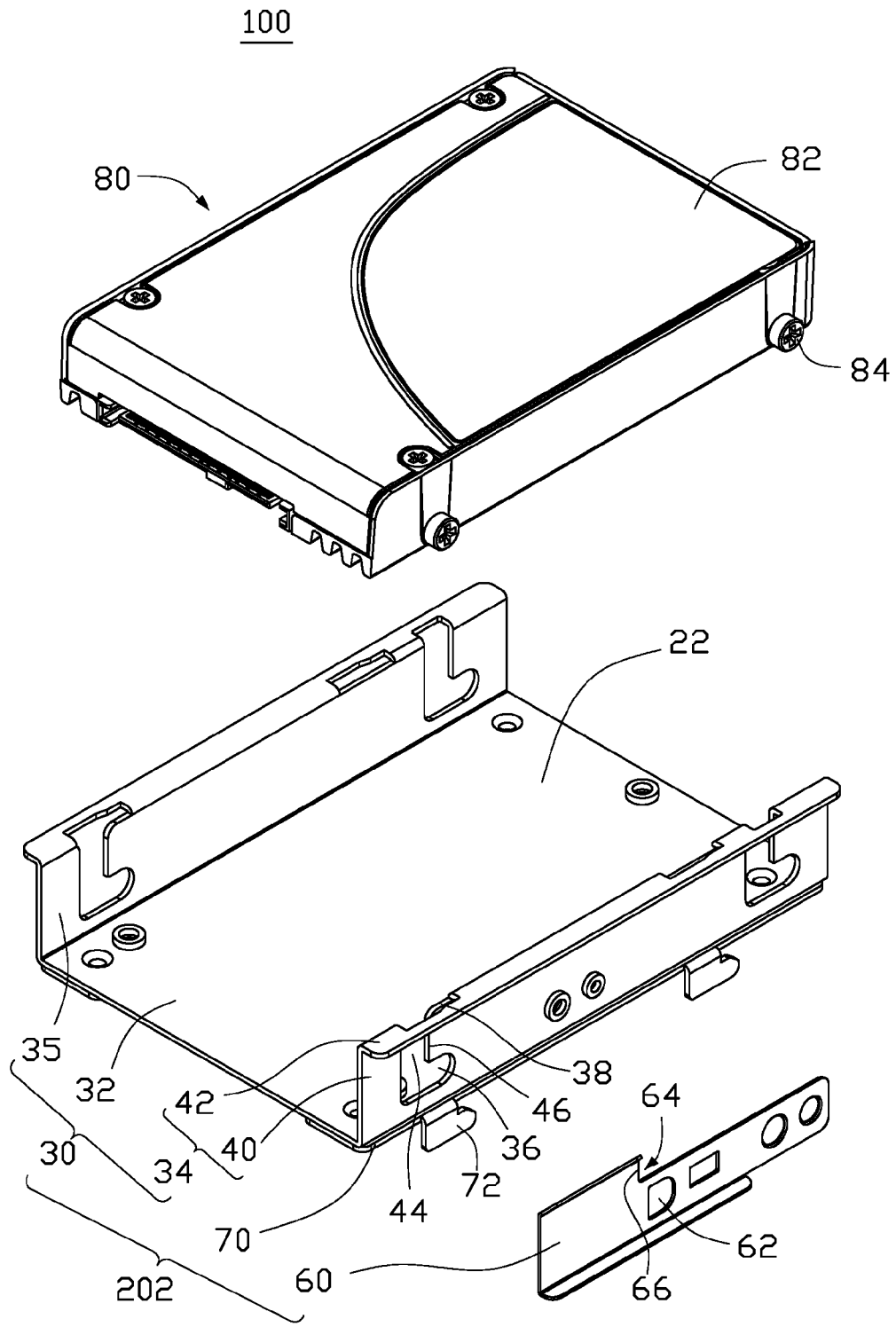
FIG. 2 is an exploded view of the data storage mounting apparatus of FIG. 1.
Figure 3:
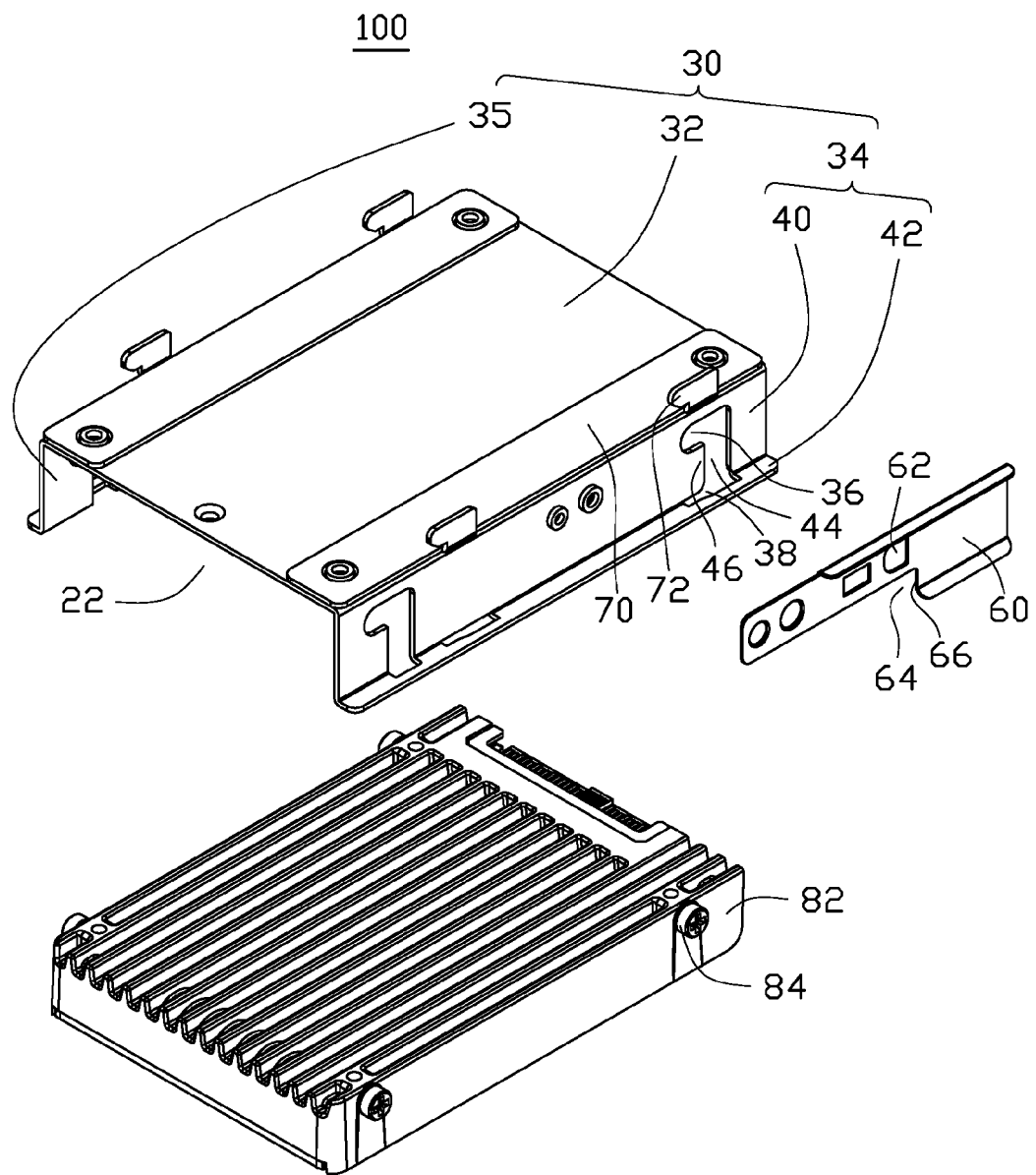
FIG. 3 is similar to FIG. 2, but viewed from a different viewpoint.

FIGS. 2 and 3 illustrate the installing rack 20 which includes a tray 30, locking pieces 60, and a connecting piece 70. The tray 30 includes a bottom wall 32 and two sidewalls 34. The two sidewalls 34 perpendicularly extend from two opposite edges of the bottom wall 32. The bottom wall 32 and the two sidewalls 34 together define the receiving space 22 The sidewall 34 defines an installing hole 36 and a locking hole 38.

The locking piece 60 defines a restriction hole 62 and a gap 64. The locking piece 60 includes a locking portion 66 located beside the gap 64. The locking piece 60 is fixed to an external side of the sidewall 34. The restriction hole 62 communicates with the installing hole 36.

The data storage device 80 includes an enclosure 82 and a number of mounting pieces 84. The mounting pieces 84 protrude from two opposite external sides of the enclosure 82. The enclosure 82 is received in the receiving space 22 to prevent the data storage device 80 moving sideways along the bottom wall 32. The mounting piece 84 passes through the installing hole 36 to be located in the restriction hole 62, this prevents the data storage device 80 moving lengthways along the bottom wall 32.

The connecting piece 70 is fixed below the bottom wall 32. The connecting piece 70 includes a hook portion 72. The hook portion 72 of one tray passes through the locking hole 38 of another, adjacent tray, to hook onto the external side of the sidewall 34 of the another, adjacent tray. The locking portion 66 abuts against the hook portion 72 to prevent the connecting piece 70 from moving lengthways along the bottom wall 32.

Each sidewall 34 includes a base wall 40 connecting the bottom wall 32 and a connecting wall 42. Two connecting walls 42 extend from two ends of the two base walls 40 away from the bottom wall 32 and apart from each other in a co-planar fashion. The connecting wall 42 is parallel to the bottom wall 32. The base wall 40 defines the installing hole 36. The connecting wall 42 defines the location of a locking hole 38 adjacent to the base wall 40. The base wall 40 further defines a connecting hole 44 communicating between the installing hole 36 and the locking hole 38. A size of the connecting hole 44 along the longitudinal direction of the bottom wall 32 is smaller than a size of the installing hole 36 and the locking hole 38 along the longitudinal direction of the bottom wall 32. Thus, a restriction portion 46 is formed beside the connecting hole 44.

Figure 4:
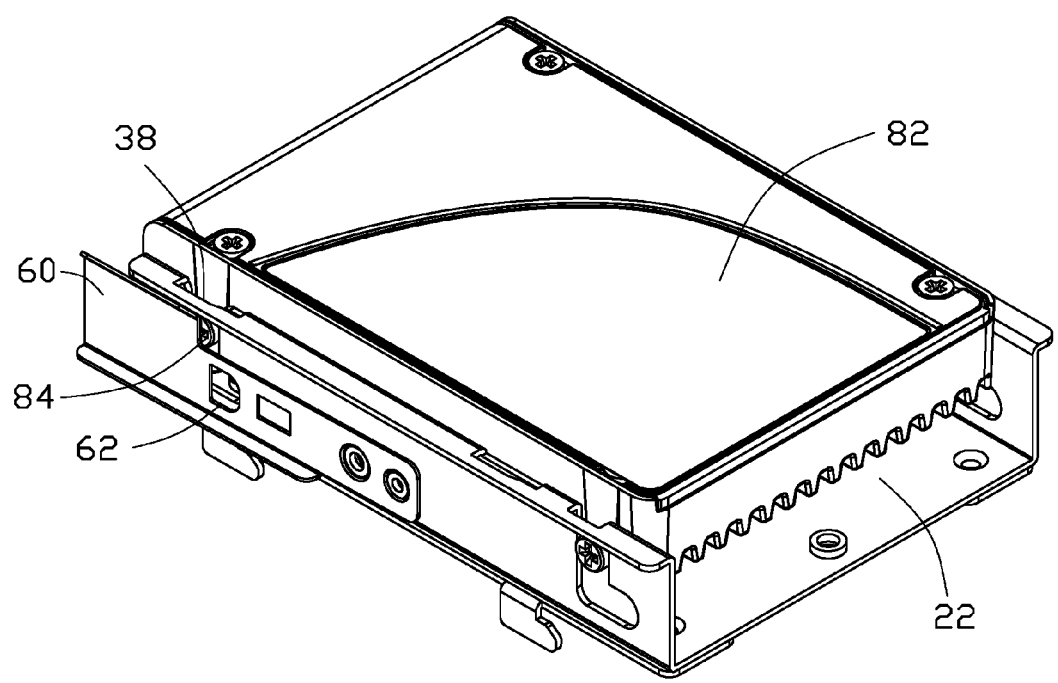
FIG. 4 is a schematic view for assembling a data storage device to a tray of the data storage mounting apparatus of FIG. 2.

The locking piece 60 is elastic. FIGS. 1 and 4 illustrate that when assembling a data storage device 80 to the tray 30, the mounting piece 84 is aligned with the locking holes 38 along a direction perpendicular to the bottom wall 32. The mounting piece 84 passes through the locking hole 38 and moves along the connecting hole 44 to deform the locking piece 60 away from the base wall 40 and to locate piece 84 in the installing hole 36. Then the mounting piece 84 moves along the longitudinal direction of the bottom wall 32 to be located under the restriction portion 46 and the locking piece 60 elastically returns toward the base wall 40 to enable the mounting piece 84 to be received and locked in the restriction hole 62.

Figure 5:
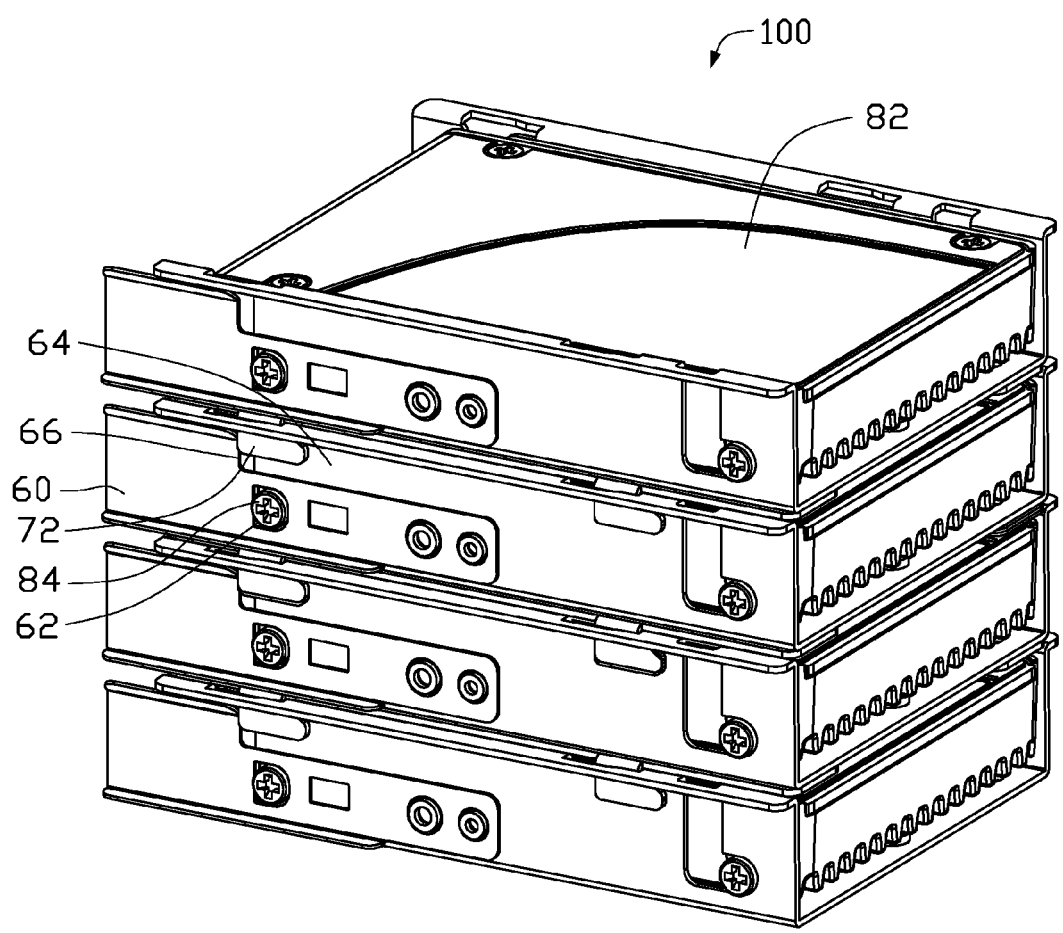
FIG. 5 is a schematic view for assembling another installing rack to the installing rack of FIG. 4.

FIGS. 1 and 5 illustrate that when assembling two installing racks 20 together, the hook portion 72 of one installing rack 20 is aligned with the locking hole 38 of another installing rack 20 along a direction perpendicular to the bottom wall 32 of the another installing rack 20. The hook portion 72 moves to the bottom wall 32 to enable the locking piece 60 to be deformed away from the base wall 40 to be located in the locking hole 38. Then the hook portion 72 moves along the longitudinal direction of the bottom wall 32 to be located above the restriction portion 46 and hook onto the connecting wall 42. The locking piece 60 returns to the base wall 40 to abut against the hook portion 72.

The embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A data storage mounting apparatus comprising:
a plurality of installing racks, the installing racks being stackably arranged, each installing rack comprising:
a tray comprising a bottom wall and a first sidewall extending from the bottom wall, the tray defining a receiving space above the bottom wall, the first sidewall defines a locking hole;
an elastic locking piece fixed to an external side of the first sidewall, the locking piece defining a gap and comprising a locking portion located beside the gap;
a connecting piece fixed to a side of the bottom wall opposite to the receiving space, the connecting piece comprising a hook portion;
and a plurality of data storage devices, each data storage device received by a respective one of the receiving spaces of the installing racks, and fixed thereto the installing racks;
wherein the hook portion of one of the installing racks is deformed by the hook portion of an adjacent installing rack of the plurality of installing racks, such that the hook portion can pass through the locking hole of the adjacent installing rack and hook onto the external side of the adjacent installing rack and be received in the gap of the locking piece to abut against the locking portion of the locking piece.

2. The data storage mounting apparatus as claimed in claim 1, wherein the tray comprises a second sidewall, the first sidewall and the second sidewall perpendicularly extend from two opposite edges of the bottom wall, the bottom wall and the first and second sidewalls together define the receiving space.

3. The data storage mounting apparatus as claimed in claim 1, wherein the first sidewall comprises a base wall connected to the bottom wall, and a connecting wall, the connecting wall extends from an end of the base wall away from the bottom wall and apart from the bottom wall such that the connecting wall and the bottom wall lie in parallel planes, the connecting wall defines a location of the locking hole adjacent to the base wall.

4. The data storage mounting apparatus as claimed in claim 3, wherein each data storage device comprises an enclosure and a mounting piece protruding from an external side of the enclosure, the base wall defines an installing hole, the locking piece defines a restriction hole communicating with the installing hole, the mounting piece of one of the data storage devices passes through the installing hole of a respective one of the installing racks and is located in the restriction hole of the locking piece of the respective installing rack.

5. The data storage mounting apparatus as claimed in claim 4, wherein the base wall further defines a connecting hole communicating between the installing hole and the locking hole.

6. The data storage mounting apparatus as claimed in claim 5, wherein a size of the connecting hole along the longitudinal direction of the bottom wall is smaller than a size of the installing hole and the locking hole along the longitudinal direction of the bottom wall, a restriction portion is formed beside the connecting hole.

7. The data storage mounting apparatus as claimed in claim 6, wherein the hook portion is configured to pass through the locking hole and move along the locking hole to be located above the restriction portion and hook onto the connecting wall.

8. A data storage mounting apparatus comprising:
a plurality of installing racks, each installing rack comprising:
a tray defining a receiving space and comprising a bottom wall below the receiving space, the tray further comprising a first sidewall perpendicularly extending from the bottom wall, the first sidewall defining a locking hole;
an elastic locking piece fixed to an external side of the first sidewall, the locking piece defining a gap and comprising a locking portion located beside the gap;
a connecting piece fixed below the bottom wall, the connecting piece comprising a hook portion; and
a plurality of data storage devices, the data storage devices received by a respective one of the receiving spaces of the installing racks, and fixed thereto the bottom wall;
wherein the locking piece of one of the installing racks is deformable by the hook portion of an adjacent installing rack of the plurality of installing racks, such that the hook portion can pass through the locking hole of the adjacent installing rack and hook onto the external side of the adjacent installing rack, and the locking portion of the locking piece can abut against the hook portion.

9. The data storage mounting apparatus as claimed in claim 8, wherein the tray further comprises a second sidewall, the first sidewall and the second sidewall perpendicularly extend from two opposite edges of the bottom wall, the bottom wall and the first and second sidewalls together define the receiving space.

10. The data storage mounting apparatus as claimed in claim 8, wherein the first sidewall comprises a base wall connected to the bottom wall, and a connecting wall, the connecting wall extends from an end of the base wall away from the bottom wall and apart from the bottom wall such that the connecting wall and the bottom wall lie in parallel planes, the connecting wall defines a location of the locking hole adjacent to the base wall.

11. The data storage mounting apparatus as claimed in claim 10, wherein the data storage device comprises an enclosure and a mounting piece protruding from an external side of the enclosure, the base wall defines an installing hole, the locking piece defines a restriction hole communicating with the installing hole, the mounting piece of one of the date storage devices passes through the installing hole of a respective one of the installing racks and is located in the restriction hole of the locking piece of the respective installing rack.

12. The data storage mounting apparatus as claimed in claim 11, wherein the base wall further defines a connecting hole communicating between the installing hole and the locking hole.

13. The data storage mounting apparatus as claimed in claim 12, wherein a size of the connecting hole along the longitudinal direction of the bottom wall is smaller than a size of the installing hole and the locking hole along the longitudinal direction of the bottom wall, a restriction portion being formed beside the connecting hole.

14. The data storage mounting apparatus as claimed in claim 13, wherein the hook portion is configured to pass through the locking hole and move along the locking hole to be located above the restriction portion and hook onto the connecting wall.

* * * * *